Oct. 13, 1925.  
R. D. EVANS  
1,557,038  
POWER FACTOR METER  
Filed June 9, 1920  
2 Sheets-Sheet 1

*Fig.1*

WITNESSES:  
J. A. Helsel  
J. M. Procter

INVENTOR  
Robert D. Evans.  
BY  
Wesley G. Carr  
ATTORNEY

Oct. 13, 1925.
R. D. EVANS
POWER FACTOR METER
Filed June 9, 1920     2 Sheets—Sheet 2
1,557,038
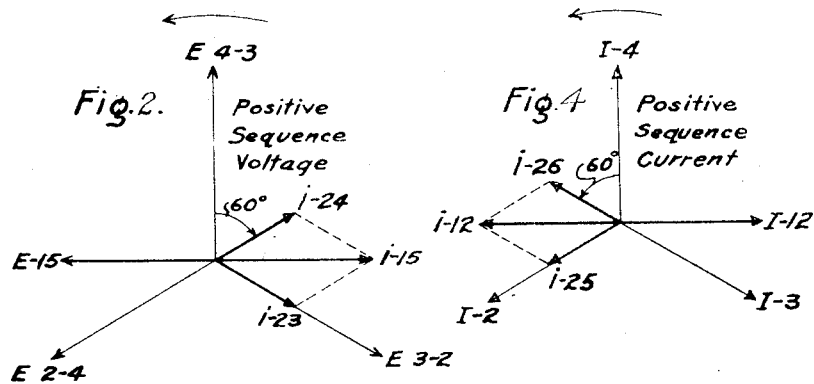
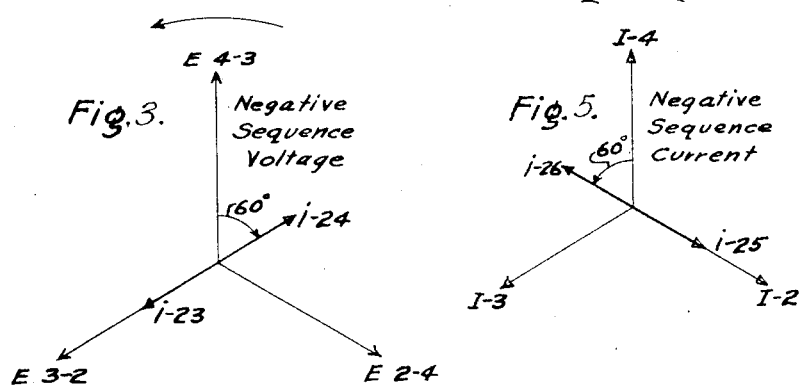
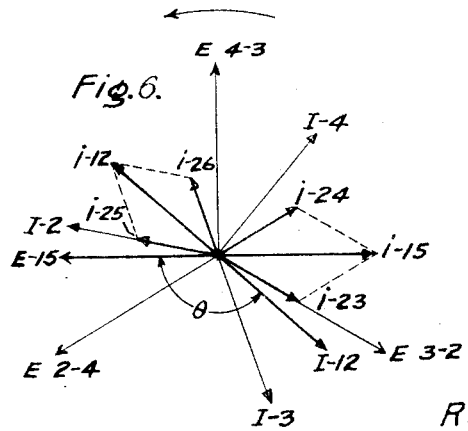
WITNESSES:
INVENTOR
Robert D Evans
BY
ATTORNEY Patented Oct. 13, 1925.

1,557,038

UNITED STATES PATENT OFFICE.

ROBERT D. EVANS, OF PITTSBURGH, PENNSYLVANIA, ASSIGNOR TO WESTINGHOUSE ELECTRIC & MANUFACTURING COMPANY, A CORPORATION OF PENNSYLVANIA.

POWER-FACTOR METER.

Application filed June 9, 1920. Serial No. 387,607.

*To all whom it may concern:*

Be it known that I, ROBERT D. EVANS, a citizen of the United States, and a resident of Pittsburgh, in the county of Allegheny and State of Pennsylvania, have invented a new and useful Improvement in Power-Factor Meters, of which the following is a specification.

My invention relates to measuring systems and particularly to means for, and methods of, measuring the power factors of polyphase circuits.

One object of my invention is to provide a measuring device for indicating the power factor of an unbalanced polyphase circuit.

A further object of my invention is to provide a device of the above indicated character that shall be simple and inexpensive to construct and effective and accurate in its operation.

My copending application, Serial No. 358,440, filed Feb. 13, 1920, discloses a static system whereby ordinary measuring instruments may be so connected to polyphase circuits as to indicate the positive or negative sequence components of the unbalanced quantities traversing the circuit.

It may be pointed out that power-factor meters, as heretofore constructed, which indicate correctly on a balanced system indicate incorrectly on an unbalanced system. It may also be pointed out, as disclosed in copending application, Serial No. 358,373, filed Feb. 13, 1920, by C. L. Fortescue, L. W. Chubb and J. Slepian, and assigned to the Westinghouse Elec. & Mfg. Co., that any unbalanced polyphase system of electrical quantities may be resolved into two or more balanced or symmetrical systems, which, in a three-phase four-conductor system, may be termed the zero, the positive and the negative rotational or sequence components. That is, the voltage, current or any other electrical quantity in a three-phase unbalanced circuit may be resolved into a zero sequence component, a positive sequence component and a negative sequence component. The zero sequence component is zero in a three-phase three-conductor circuit.

In practicing my invention, I provide two single-phase power-factor meters and means for operatively connecting the same to a single pointer. The current winding of one meter is provided with current proportional to the positive sequence current of the system and the potential winding of that meter is provided with current proportional to the positive sequence voltage of the system. Similarly, the current and potential windings of the other meter are provided with current proportional to the negative sequence current and the negative sequence voltage of the system, respectively. Thus, one meter is actuated in accordance with the power factor of the positive sequence system and the other meter in accordance with the power factor of the negative sequence system. Since the meters are connected together, the pointer will indicate the true power factor of the system, irrespective of the unbalance thereof.

Figure 1 of the accompanying drawing is a diagrammatic view of a measuring device and circuits embodying my invention as applied to a three-phase circuit, and Figs. 2 to 6, inclusive, are vector diagrams of the forces applied to one of the meter elements.

A polyphase circuit 1 comprises conductors 2, 3 and 4 upon which is impressed an unbalanced voltage or upon which the load is so unbalanced as to cause the voltage thereof to be unbalanced. Two single-phase power-factor meters 5 and 6 have the movable vanes 7 and 8 thereof mounted on a single shaft 9 and operatively connected to a pointer 10. The current winding 11 of the meter 5 is connected to the secondary winding 12 of a transformer 13, and the voltage winding 14 of the meter 5 is connected to the secondary winding 15 of a transformer 16. Similarly, the current winding 17 of the meter 6 is connected to the secondary winding 18 of a transformer 19, and the potential winding 20 of the meter 6 is connected to the secondary winding 21 of a transformer 22. The meters 5 and 6 are standard phase meters such as are shown in Conrad Patent No. 695,913, issued March 25, 1902, and assigned to the Westinghouse Electric & Mfg. Co. However, any other form of phase meter may be employed.

The transformer 16 has two primary windings 23 and 24, and the transformer 13 has two primary windings 25 and 26. Similarly, the transformer 22 has two primary windings 27 and 28 and the transformer 19 has two primary windings 29 and 30. The winding 23 is connected, through a resistor 31, across the conductors 2 and 3 of the circuit 1. The winding 24 is connected in series with a resistor 32 and a reactor 33 across the conductors 3 and 4 of the circuit 1. The impedances of the reactor 33 and resistor 32 are of such value that the current traversing the winding 24 lags 60° behind the voltage across the conductors 3 and 4, and is of the same magnitude as that traversing the winding 23 under balanced conditions. The resistor 31 is of such high resistance that the current traversing the winding 23 is in phase with the voltage across the conductors 2 and 3. The windings 23 and 24 are so connected as to assist each other for one sequence of voltage and to oppose each other for the other sequence of voltage. The winding 27 of the transformer 22 and the winding 28 thereof are connected to the resistors 31 and 32, and the reactor 33 substantially as set forth with respect to the windings 23 and 24, with the exception that the winding 27 is connected across the conductors 2 and 4 and the winding 28 is connected across the conductors 3 and 4.

The windings 25 and 26 of the transformer 13 are connected to series transformers 34 and 35 that are associated with the conductors 2 and 4 of the circuit 1 and have resistors 36 and 37 in series therewith. A resistor 38 is connected across the winding 25, and a resistor 39 and a reactor 40 are series connected across the winding 26. The windings 29 and 30 of the transformer 29 are similarly connected to the transformers 34 and 35, with the exception that the transformer 35, in this instance, is associated with the conductor 3 instead of with the conductor 4. The resistors 36, 37, 38 and 39 and the reactor 40 are similarly associated with the windings 29 and 30. The windings 25 and 26 are so connected as to assist each other for one sequence of current and to oppose each other for another sequence of current, as do the windings 29 and 30, similar to the windings 23 and 24. The resistor 38 has voltage impressed thereacross which is proportional to the current traversing the conductor 2 of the circuit 1, and the resistor 39 and reactor 40 have voltage impressed thereacross which is proportional to the current traversing the conductor 4. The resistors 36 and 38 are so adjusted that the current traversing the winding 25 is substantially in phase with the current traversing the secondary winding of the transformer 34. The resistors 37 and 39 and reactor 40 are so adjusted that the current traversing the winding 26 is substantially 60° out of phase with the current traversing the secondary winding of the transformer 35.

In considering the vector diagrams in the accompanying drawing, the unbalanced systems of circuit voltages and currents may be considered as being separated in balanced symmetrical systems of positive sequence and of negative sequence voltages and currents. For the purpose of illustration and explanation, we may consider only the positive-sequence system or component of the circuit voltage and the positive-sequence system or component of the circuit current, since, with proper connections, only the positive-sequence voltage and current will be effective to influence the operation of the power-factor meter 5. Similiary, by proper connections, as illustrated with relation to the transformers 22 and 19, only the negative-sequence components of voltage and of current are segregated to influence the power-factor meter 8.

In Figs. 2 and 3 are illustrated the relations between the several voltage vectors corresponding to the voltages between different points of the network containing the transformer 16. Fig. 2 illustrates the voltages established when the positive-sequence is impressed upon the network and Fig. 3 illustrates the arrangement of the voltages when the negative-sequence is impressed upon the network.

Considering the phase rotation of the circuit to be 4—3—2, the voltages of the positive-sequence system may be represented, as illustrated in Figs. 2 and 3, by the large vectors respectively labelled E 4—3, E 3—2 and E 2—4.

The vector $i$—24 represents the current traversing the winding 24 and lagging 60° behind the voltage E 4—3. The vector $i$—23 represents the current traversing the winding 23 and is in phase with the voltage E 3—2 which is impressed upon the circuit containing the winding 23. The effective flux-producing current may be represented by the resultant vector $i$—15. The vector E—15 may be regarded as a function of the electromotive force induced in the secondary winding 15 of the transformer 16.

The network thus serves to segregate from the positive-sequence system in the circuit an electric force which is a function of one of the single-phase elements constituting the positive-sequence component of the circuit voltage. The winding 14 of the power-factor meter element is therefore energized in accordance with the segregated voltage.

Upon referring to Fig. 3, it will be seen that the negative-sequence system or component of the circuit voltage has no effect upon the winding 14 of the power-factor meter. Since the phase rotation of the circuit is E 4—3—2, the negative-sequence system of voltages will be composed of voltages arranged in the order E 4—3, E 2—4 and E 3—2. The current caused to traverse the winding 23 by the negative-sequence system of voltages will be in phase with the corresponding voltage E 3—2 and may be represented again by the current vector $i$—23. Similarly, the current traversing the winding 24 may be represented by the current vector $i$—24 lagging 60° behind the voltage E 4—3 that is impressed upon the winding 24. It will be seen, upon referring to the diagram of Fig. 3, that the currents traversing the windings 23 and 24 are opposite in phase and no flux therefore will be induced in the transformer and, consequently, no voltage will be developed in the secondary winding 15.

From the foregoing explanations, it will be clear that the network, as described, serves to segregate from the circuit an electrical force that is a function of the positive-sequence component of the circuit voltage and to prevent the power-factor meter from being influenced by the negative-sequence component of the circuit voltage.

In Fig. 4 is represented vectorially the relation between the currents traversing the several windings of the transformer 13 whereby a value that is a function of the positive-sequence component of current in the circuit may be segregated from the circuit.

The vector $i$—25 represents the current caused to traverse the winding 25 and is in phase with the current traversing the current transformer 34, which corresponds to the current in conductor 2, as represented by the large current vector I—2. The small vector $i$—26 represents the current caused to traverse the winding 26 of the transformer 13 and it leads the current in the transformer 35, corresponding to the current in conductor 4, by 60°. The effective flux-producing current of the transformer 13 may therefore be represented by the current vector $i$—12 and the vector I—12 may be regarded as a function of the current induced in the secondary winding 12. The current induced in the secondary winding 12 is proportional to the value indicated by the vector I—12 and is therefore a function of the value of one of the elements of the positive-sequence system, or component, of circuit current.

Upon referring to Fig. 5, it will be apparent that the negative-sequence system, or component, of the circuit current does not influence the winding 11 of the power-factor meter, since the windings 25 and 26 are respectively traversed by currents that are opposite in phase, as illustrated by the small current vectors $i$—25 and $i$—26 in Fig. 5. The current winding 11 of the power-factor meter is therefore influenced only by a current which is a function of the value of an element of the positive phase-sequence component of the circuit current.

The power-factor meter 5 will therefore measure the power factor of the positive-sequence system of the circuit voltage and current and, similarly, the power-factor meter 6 will measure the power factor of the negative-sequence system of the circuit voltage and current, the different values being segregated by means of the transformers 22 and 19 in a manner corresponding to that already explained with reference to the transformers 16 and 13.

In Fig. 6 is illustrated the positive-sequence system of voltage and current comprising the systems shown in Fig. 2 and in Fig. 4. When conditions of 100% power factor obtain in the positive-sequence component power, the positive-sequence component of the circuit current in the conductor 4 will lag 30° behind the positive-sequence component of the voltage E 4—3. The power-factor meter 5 may therefore be so adjusted that its pointer and scale will register 100% power factor when the aforementioned angular relation between the voltage and current obtains. The power-factor meter will then indicate any deviation of the current from its normal position of 30° lagging. Since the positive and the negative sequence components are symmetrical in that the several elements are equally spaced apart and of the same maximum value, the deviation from a predetermined angular relation between any voltage and current elements of the symmetrical components may be equally well measured even though they may not be elements of the same phase, if only the power-factor meter be adjusted to indicate 100% power factor for the normal relation of the voltage and current elements chosen.

In Fig. 6 is illustrated the relation between the positive-sequence components of the circuit voltage and the circuit current. The vectors E—15 and I—12 represent the forces which serve to energize the respective voltage and current windings of the power-factor meter, and the angular relation between these forces relative to a predetermined normal relation indicates the power factor of the positive-sequence component of power of the circuit.

The vector relation of the voltage and the current forces present in the networks associated with the transformers 22 and 19 may be simlarly obtained to show the relation of the different forces of the negative-sequence systems of circuit voltage and current.

In selecting suitable reactors for different polyphase systems, it should be borne in mind that a network which is to segregate a positive-sequence component of an electrical quantity should preclude the transmission of the negative-sequence component of that quantity. Thus, where one of the derived forces is in phase with one element of the polyphase quantity, the reactive element should be such as to establish a neutralizing derived force from another element or phase of the polyphase quantity when subjected to one sequence component if a measurement of another sequence component is desired.

Thus, in a three-phase system where one of the derived forces is in phase with one of the phase currents or voltages, a reactor should be employed having such characteristics that the other derived force will be caused to either lead or lag one of the other phase currents or voltages by 60° in order to neutralize or counterbalance the first derived force when one of the phase-sequence components is impressed upon the network. Similarly, in two-phase system, the reactors should have such characteristics as to cause the derived force to lead or lag one of the impressed phase voltages or currents by 90°. The two derived forces are then of opposite phase relation when one sequence component is impressed on the network, and no force is admitted to the instrument that is a function of a quantity of that sequence component.

With the connections as illustrated, magnetic flux is induced in the core member of the transformer 16 to thereby cause current to traverse the windings 14 and 15 when a balanced polyphase voltage of predetermined phase sequence exists in the circuit 1. Also, the resistor 31 and the impedance of the circuit comprising the resistor 32 and the reactor 33 is such that no magnetic flux interlinks with the circuit when a balanced polyphase voltage of other phase sequence is applied to the circuit.

It will be seen that, with the connections of the transformer 16, as shown, the resultant flux interlinking with the winding 15 and, consequently, traversing the winding 14 of the meter 5, will be proportional to the direct rotational component or the positive sequence component of the unbalanced voltage impressed on the circuit 1. Similarly, the winding 20 of the meter 6 will be supplied with current proportional to the counter-rotational component or negative sequence component of the unbalanced voltage impressed on the circuit 1.

Since the windings 25 and 26 have current traversing the same that is proportional to the voltage drop across the resistor 38 and the resistors 39 and 40, respectively, and, since the windings 29 and 30 are also traversed by current proportional to the voltage drops across their respective resistors 38 and 39 and reactor 40, the windings 12 and 18 of the transformers 13 and 19 will be traversed by current proportional to the positive sequence component and the negative sequence component of the current traversing the circuit 1, respectively.

Since the movable vanes 7 and 8 of the meters 5 and 6 will tend to assume positions representing the phase angular relation between the currents traversing the windings 11 and 14 and 17 and 20, respectively, it will be understood that the vane 7 will tend to assume a position that corresponds to the power factor of the positive sequence component of the circuit 1, and the vane 8 will tend to assume a position corresponding to the power factor of the negative sequence component of the circuit 1. Thus, since the two vanes 7 and 8 are operatively connected together, the pointer 10 will indicate the sum of the positive and negative sequence power factors or the total power factor of the circuit 1. It will be understood that this indication is the indication of the true power factor of the circuit, irrespective of the unbalance of the same.

My invention is not limited to the specific devices illustrated, as it may be variously modified without departing from the spirit and scope of the invention, as set forth in the appended claims.

I claim as my invention:—

1. A measuring instrument comprising two single-phase power-factor meters operatively connected together, means for actuating one of the meters in accordance with the phase-angular relation between the positive sequence current and voltage and the other meter in accordance with the phase-angular relation between the negative sequence current and voltage.

2. In a polyphase electric circuit, the combination with two single-phase operatively-connected phase meters, of segregating means connected between the circuit and each phase meter for segregating a symmetrical component of an electrical quantity of the circuit to subject the associated meter to such component, and an indicator controlled by the phase meters to indicate a quantity proportional to the power factor of the circuit.

3. In a polyphase electric circuit, the combination with two single-phase operatively-connected power-factor meters, of means for actuating one in accordance with the power factor of the positive sequence system and the other in accordance with the power factor of the negative sequence system of the circuit.

4. In a polyphase electric circuit, the combination with an indicating device, of means connected between the circuit and the device for segregating a symmetrical component of the voltage of the circuit and subjecting the device thereto and for segregating a symmetrical component of the current of the circuit and subjecting the device thereto, and means controlled by the indicating device to indicate the power factor of the circuit, irrespective of any unbalance thereof.

5. In a polyphase electric circuit, the combination with an indicating device, of means for separating the positive and negative-phase-sequence components of the system connected between the circuit and the indicating device whereby the indicating device is actuated in accordance with the power factor of the circuit, irrespective of the unbalance of the load thereon.

6. In a polyphase electric circuit, the combination with two single-phase power-factor meters, a single pointer and means for operatively connecting both meters to the pointer, of means whereby one meter is actuated in accordance with the positive sequence power factor and the other in accordance with the negative sequence power factor.

7. In a polyphase electric circuit, the combination with two single-phase power-factor meters, a single pointer actuated by the movements of both meters, of means connected between the meters and the circuit whereby one meter is actuated in accordance with the positive sequence power factor and the other in accordance with the negative sequence power factor of the circuit.

8. The method of determining the power factor of an unbalanced polyphase circuit which consists in segregating the positive and the negative sequence systems present in the circuit and determining the sum of the power factor of the positive sequence system and the power factor of the negative sequence system of the circuit.

9. The method of determining the power factor of an unbalanced polyphase circuit which consists in segregating the positive sequence system and the negative sequence system, measuring the power factors of the respective systems and then combining the measurements.

10. The combination with a polyphase electric circuit and a single-phase power-factor meter comprising a voltage coil and a current coil, of segregating means connected between the circuit and the windings of the meter to subject the respective windings to a quantity proportional in value to an element of one of the sequence systems of an electrical quantity of the circuit.

11. The combination with a polyphase electric circuit and a single-phase power-factor meter comprising a voltage coil and a current coil, of segregating means connected between the circuit and the voltage winding to subject the winding to a voltage proportional to the value of one of the sequence systems of the circuit voltage, segregating means connected between the circuit and the current winding to subject the winding to a current proportional to the value of the corresponding sequence system of the circuit current, and an indicating element for indicating the power factor of the sequence system segregated.

12. The method of determining the power factor of an unbalanced polyphase circuit which consists in segregating the several sequence systems present in the circuit, measuring the power factors of the several systems and combining the several measurements.

13. The combination with a polyphase electric circuit and a single-phase power-factor meter, of means for segregating the corresponding sequence systems of the voltage and the current of the circuit, and means for subjecting the meter to electrical quantities derived from said segregated systems to indicate the power factor of the system.

14. The combination with an unbalanced polyphase electric circuit and a single-phase power-factor meter, of segregating means connected between the circuit and the meter to segregate and subject the meter to single-phase quantities proportional in value to the balanced sequence systems in the circuit, whereby the single-phase meter may indicate the power factor of the polyphase circuit, irrespective of conditions of unbalance.

15. The method of measuring the power factor of an unbalanced polyphase circuit which consists in segregating from the circuit several electrical forces whereby the power factors of the different sequence systems present in the circuit may be measured, and combining said segregated forces to measure the power factor of the circuit.

16. The method of measuring the power factor of an unbalanced polyphase circuit which consists in segregating from the circuit several electrical forces that are, respectively, functions of the several sequence systems present in the circuit and combining said forces to act upon a common indicating member.

In testimony whereof, I have hereunto subscribed my name this 27th day of May 1920.

ROBERT D. EVANS.